INVENTOR.
ROBERT L. DALTON
BY
ATTORNEY

INVENTOR.
ROBERT L. DALTON
BY
ATTORNEY

June 20, 1967 R. L. DALTON 3,326,102
PHOTOGRAPHIC CAMERA
Filed Dec. 21, 1964 4 Sheets-Sheet 3

INVENTOR.
ROBERT L. DALTON
BY
*B. Eshlinger*
ATTORNEY

June 20, 1967 R. L. DALTON 3,326,102
PHOTOGRAPHIC CAMERA
Filed Dec. 21, 1964 4 Sheets-Sheet 4
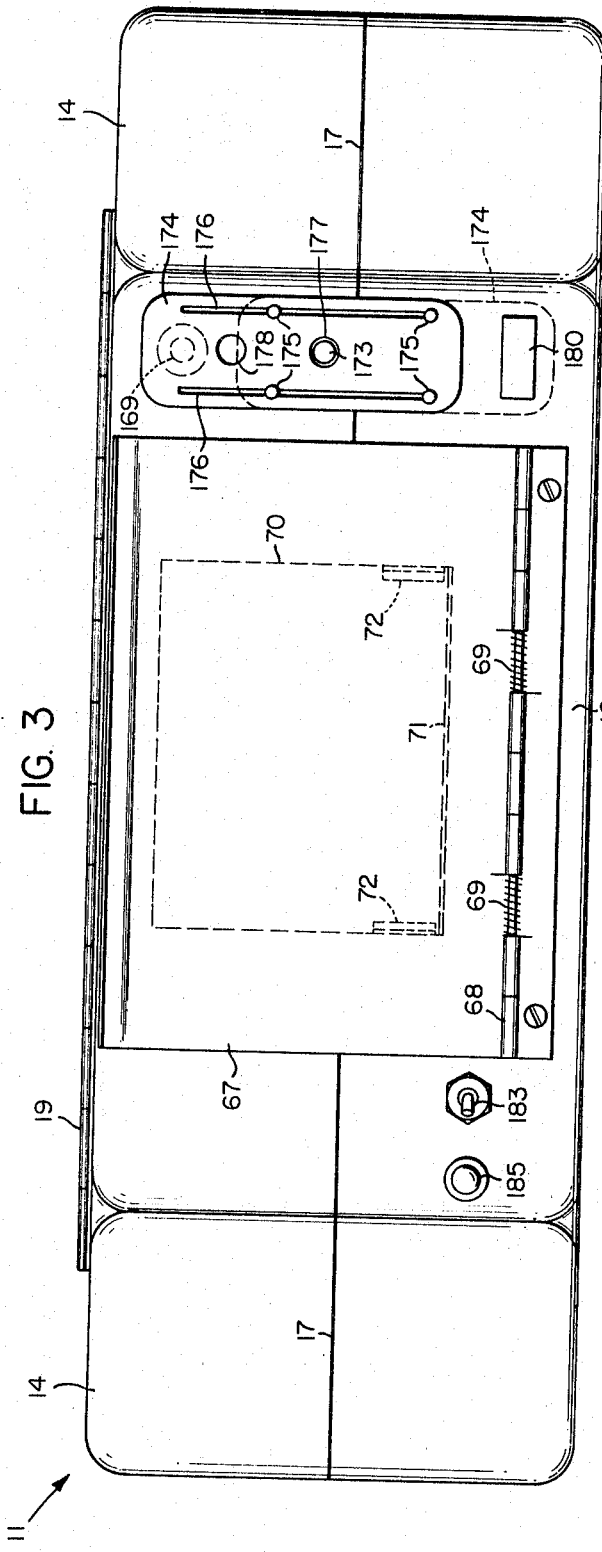
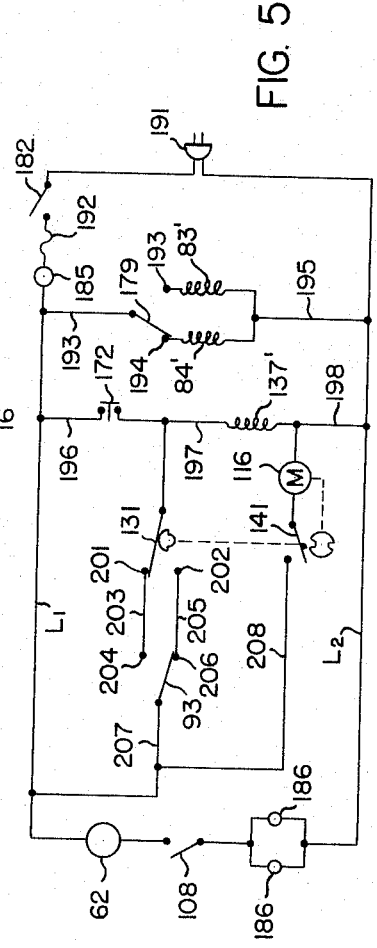
INVENTOR.
ROBERT L. DALTON
BY
ATTORNEY

United States Patent Office 3,326,102
Patented June 20, 1967

3,326,102
PHOTOGRAPHIC CAMERA
Robert L. Dalton, Pittsford, N.Y., assignor to R. D. Products, Incorporated, Pittsford, N.Y., a corporation of New York
Filed Dec. 21, 1964, Ser. No. 419,718
8 Claims. (Cl. 95—1.1)

This invention relates to cameras, and more particularly to a camera for producing pictures for identification cards (I.D. cards), and for producing such cards themselves.

Heretofore most identification cards have been produced either by gluing or photographing an individual's picture onto a blank identification card, and thereafter typing in the pertinent data regarding the individual's description. Usually this card is signed by the individual after his picture has been mounted thereon. In any case, the information added to such card can be altered either by erasure, ink eradication, or the like. Aside from this, the preparation of I.D. cards heretofore has been quite time-consuming, often involving the photographing of the individual at one site, and the actual preparation of the card itself at another.

An object of this invention is to provide a relatively small, compact camera for making I.D. cards that are effectively incapable of alteration.

To this end, it is another object of the invention to provide a camera by which an individual and his or her pertinent identifying data may be photographed simultaneously and simultaneously reproduced onto a single film frame from which an I.D. card may be printed.

Another object of the invention is to provide a camera of the character described which can be operated rapidly so as to permit practical use thereof in making individual I.D. cards successively for large groups of people.

Another object of this invention is to provide a camera of the type described which is automatic and provided with suitable electrically-operated controls for its operation.

Another object of the invention is to provide a camera of the character described, which will take roll film so as to permit taking of a series of pictures without reloading.

A further object of this invention is to provide a camera of the type described which is provided with means for protecting previously exposed film against accidental re-exposure when the camera is opened for unloading or inspection.

Other objects of the invention will be apparent hereinafter from the specification and from the recital of the appended claims, particularly when read in conjunction with the accompanying drawings.

In the drawings:

FIG. 3 is a rear elevational view of this camera;

FIG. 5 is a diagram of an electrical circuit which may be employed in this camera.

Figure 1:
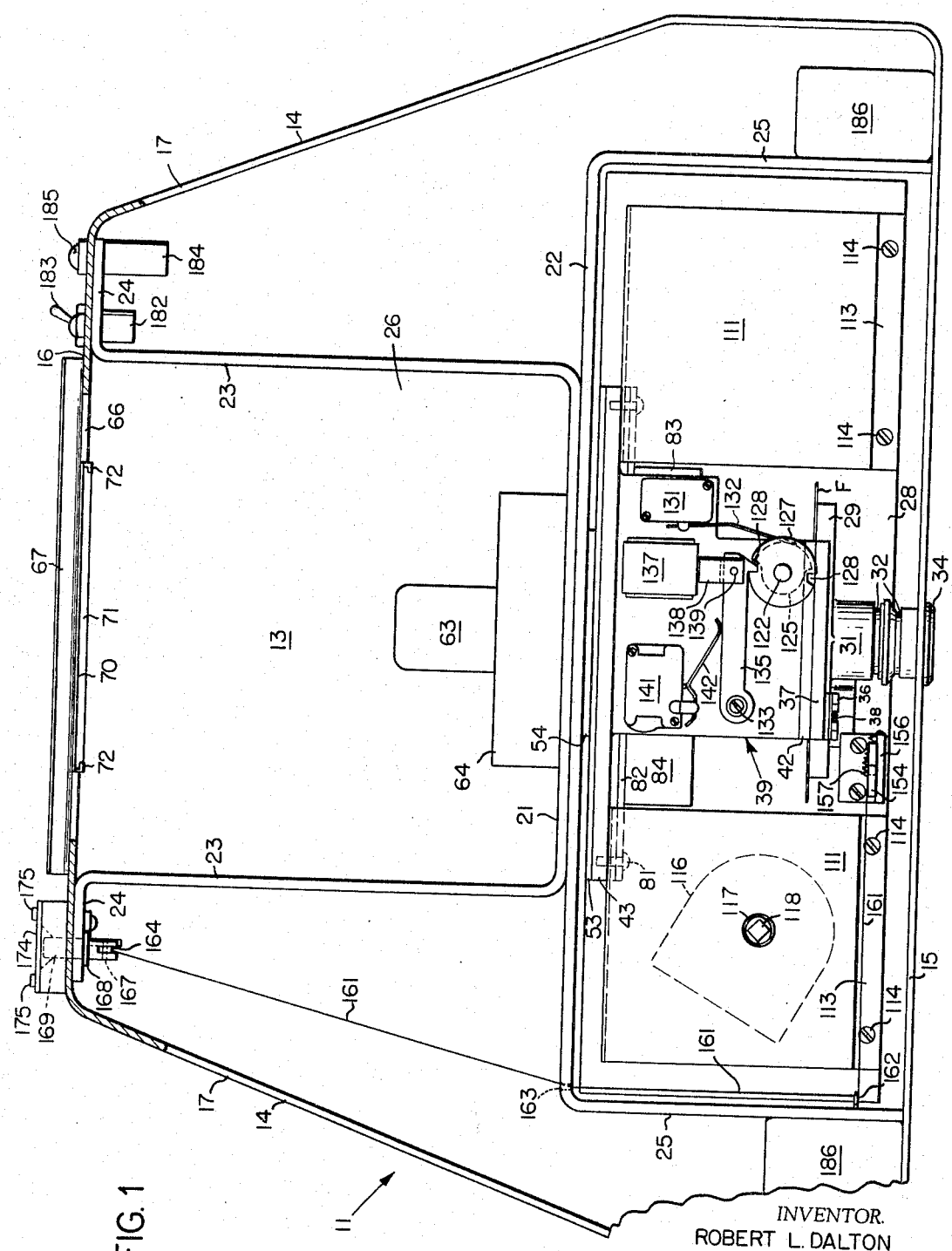
FIG. 1 is a fragmentary plan view of a camera built according to one embodiment of this invention, the top of the camera having been removed to illustrate the interior construction of the camera.

In the camera illustrated, a pair of spaced objective lenses are mounted with their axes disposed in parallel, vertically offset relation to one another. One of the lenses is adapted to register with a card, that is removably mounted in the rear wall of the camera housing, to transmit an image of the card onto a frame of film. The other objective lens is adapted to transmit the image of the subject (the person whose I.D. card is being made) to a prism, which in turn transmits the subject's image onto the same frame of film. A flash unit and a shutter are associated with each objective lens, and are operable to effect the simultaneous photographing of said card and said subject onto the single frame of film.

After a picture is taken, the film is advanced automatically to feed the next unexposed frame of film into exposure position. Unexposed film is fed into the camera's exposure chamber from a supply spool carried by a first cassette removably mounted in the camera at one side of the exposure chamber, and exposed film is wound onto a take-up spool carried by a second cassette removably mounted in the camera adjacent the opposite side of said chamber.

To change the cassettes it is necessary to open a hinged cover at the front of the camera. This cover is normally latched in closed position. To open this cover it is necessary first to energize a control mechanism which advances the film two frames, thereby assuring that all the exposed film will be fed into the film take-up cassette and enclosed before the cover can be opened.

Referring now to the drawings by numerals of reference, 11 designates generally the camera casing. It has top and bottom walls 12 and 13, respectively (FIG. 4), side walls 14, a front wall 15, and a rear wall 16. Preferably housing 11 is made in two sections, an upper and a lower section, respectively, which are secured in abutting relation to one another along the line designated at 17 in FIGS. 2 to 4. Adjacent the front end of the camera the side walls 14 extend parallel to one another for a short distance, and then converge toward one another as they approach the rear wall 16, as shown in FIG. 1.

Figure 4:
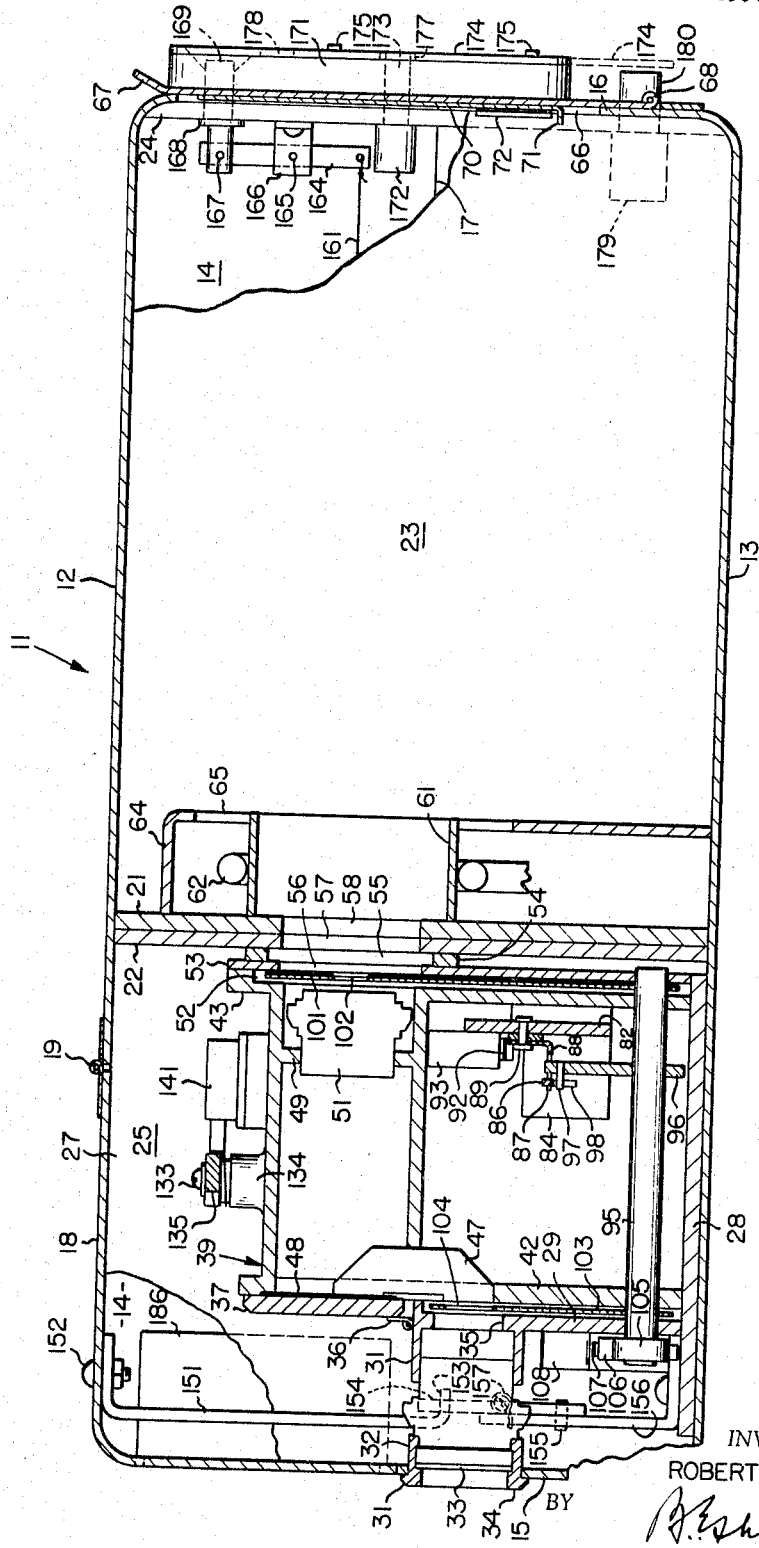
FIG. 4 is a fragmentary sectional view taken along the line 4—4 in FIG. 2 and looking in the direction of the arrows, and with parts of the camera interior cut away.

Hinged at 19 to the upper wall 12 adjacent to its forward edge, and extending down over an opening in the front wall 15 of the camera, is a right angular cover 18. Secured back to back in housing 11 rearwardly of cover 18, and extending between the top and bottom walls 12 and 13 of the housing, is a pair of generally U-shaped stampings 21 and 22 (FIGS. 1 and 4). Stamping 21 faces rearwardly, and at their rear ends its parallel leg portions 23 have laterally outwardly projecting flanges 24 which are welded or otherwise secured to the inside face of rear wall 16 adjacent opposite ends thereof, thereby forming a rear compartment or chamber 26. Stamping 22 faces forwardly, and its parallel leg portions 25 are secured at their terminal ends against the inside face of the front wall 15 of the housing, thereby forming a front compartment 27 (FIG. 4).

Figure 2:
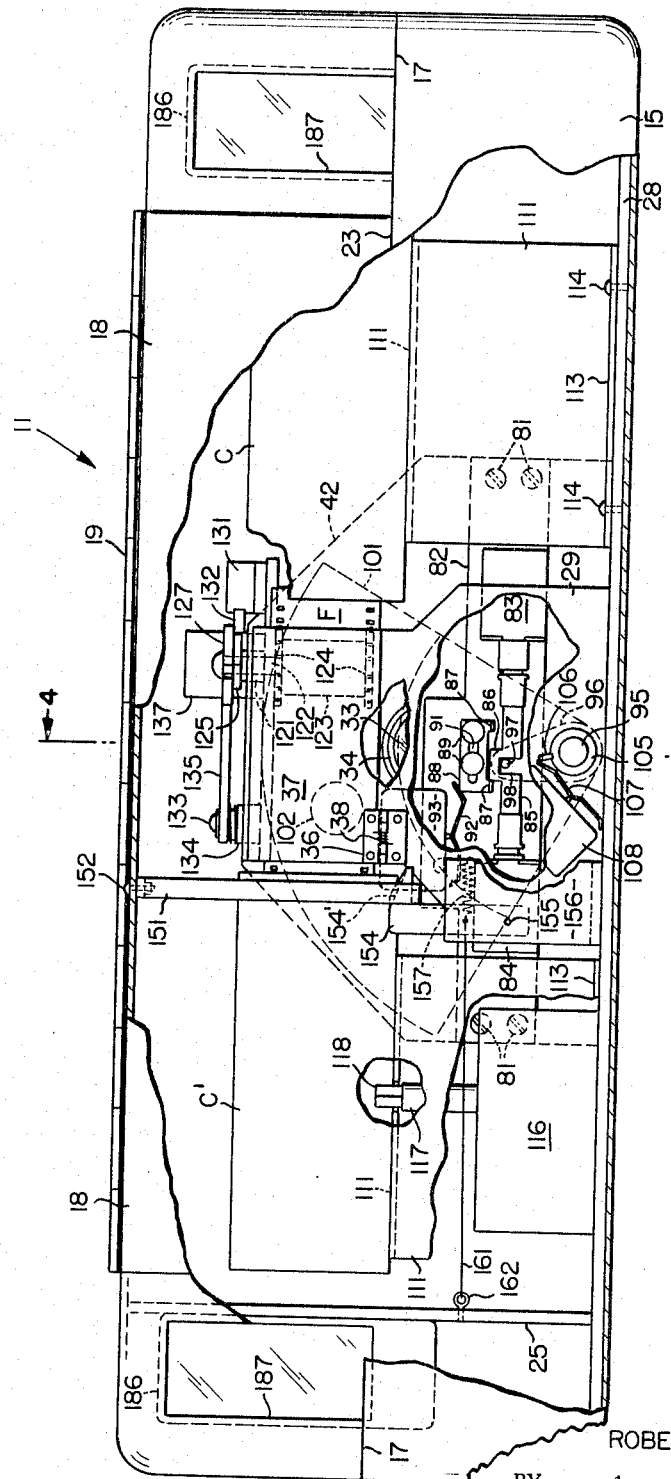
FIG. 2 is a fragmentary front elevational view of this camera with parts thereof cut away, and showing a pair of film cassettes mounted therein.

Fastened to bottom wall 13 at the bottom of front compartment 27 is a rectangular reinforcing plate 28 (FIGS. 1, 2 and 4). Welded, or otherwise secured, at its lower edge to plate 28, and projecting vertically upwardly therefrom is a lens mount 29 having a tubular, forwardly projecting portion 31 in which is removably secured an objective lens holder 32 which carries a lens 33 (FIGS. 2 and 4). Holder 32 is disposed in an opening in the front wall of the camera and its flange 34 seats against the front face of this wall.

Pivoted along its lower edge by means of a hinge 36 to the upper edge of the lens mount 29 is a rectangular, film pressure plate 37 (FIGS. 1, 2 and 4). A coil spring 38 (FIG. 1) which is coaxial with the hinge 36, tends constantly to pivot plate 37 into contact with the front face of a hollow, rectangular housing 39 constituting an exposure chamber.

Housing 39 is supported by integral, depending spaced, parallel plate portions 42 and 43 (FIG. 4) whose lower edges rest upon and are secured to plate 28.

Mounted in the open front of housing 39 is a total reflection prism 47. Prism 47 at its upper end confronts the lower half of the pressure plate 37 (FIG. 4), and at its lower end registers through an opening 35 in plate 29 with the lens 33. The front of housing 39 is recessed as at 48 to accommodate a strip of film in a manner to be described in more detail below.

Secured in an internal partition 49 (FIG. 4) formed in the housing 39 adjacent its rear end is a further objective lens mount 51. The objective lens (not illustrated), carried by the mount 51 registers with the pressure plate 37, and its axis extends parallel to, and is vertically spaced above, the axis of the lens 33.

Secured over a recess 52 formed in the rear face of the rear support plate 43 is a cover plate 53 (FIGS. 1 and 4). Plate 53 extends parallel to and is separated from the closed end of the partition 22 by a spacer 54. Spacer 54 has therein a central aperture 55 that registers through an aperture 56 in the plate 53 with the lens (not illustrated) carried by the lens mount 51, and with a pair of aligned openings 57 and 58 in the partitions 22 and 21, respectively.

Projecting rearwardly from the closed end of the partition stamping 21, and surrounding its opening 58 coaxially thereof, is a rigid sleeve 61 (FIG. 4). Surrounding sleeve 61 is a lamp 62 (broken away in part in FIG. 4). Lamp 62 is mounted in a conventional socket 63 (FIG. 1), and is surrounded by a cowling or shield 64 containing at its rear an aperture 65 (FIG. 4). The aperture 65 is substantially larger than the sleeve 61, and directs light from the lamp 62 toward an identification card at the rear of the camera housing as will be described later.

The rear housing wall 16 has therein a rectangular opening 66 (FIGS. 1 and 4). The opening 66 normally is closed by a rectangular cover 67 which is connected along its lower edge (FIGS. 3 and 4) by hinge 68 to the exterior of wall 16. The springs 69 (FIG. 3) associated with the hinge 68 tend constantly to urge the cover 67 to its closed position. Secured to the inside face of the cover 67 to register with the opening 66 in the wall 16 is a rectangular plate 70, which has a flange 71 along its lower edge, and grooved lugs 72 at its opposite sides which cooperate with the flange 71 to support an information card removably on the inside of cover 67 for a purpose to be described in more detail below.

Secured adjacent opposite ends thereof by screws 81 (FIGS. 1 and 2) to the inside face of the rear support plate 43 of housing 39, and extending across the plate beneath the housing is a strap 82. Secured to the strap 82 in spaced relation to one another, and with their armatures confronting one another, are two solenoids 83 and 84 (FIGS. 1, 2 and 4). Secured at opposite ends thereof to the armatures of the solenoids 83 and 84 to be reciprocated thereby upon alternate operation of the solenoids is a shutter actuating slide rod 85 (FIG. 2).

Intermediate its ends rod 85 has a vertically offset portion 86 (FIGS. 2 and 4) which projects upwardly between a pair of spaced lugs 87 which extend downwardly from the lower edge of a slide plate 88, which is slidably secured by studs 89 to strap 82. The studs 89 pass through an elongate slot 91 in the slide plate 88 to guide the plate for horizontal sliding movement toward and away from a switch tripping lever 92 carried by a single pole, double throw microswitch 93, which is secured to strap 82 above the solenoid 84.

Extending through, and rotatably journaled adjacent opposite ends thereof in the plates 42 and 29 and in the plates 43 and 53, respectively, to pivot about an axis which extends parallel to the axis of lens 33, is a rocker shaft 95 (FIGS. 2 and 4). Secured at one end thereof to shaft 95 between the plates 42 and 43, and projecting radially upwardly from the shaft is a rocker arm 96. At its upper end arm 96 carries a pin 97 which projects into a notch 98 formed in the slide rod 85 beneath its offset portion 86.

Secured to the shaft 95 to pivot therewith in the space 52 (FIG. 4). between plates 43 and 53 is a generally sector shutter leaf 101 (FIG. 2). Leaf 101 has therethrough an opening 102 which is adapted to register momentarily with the lens in the holder 51 each time the shutter is pivoted by shaft 95 into one or the other of its extreme positions. A second shutter leaf 103, which is similar to but smaller than the shutter leaf 101, is secured to shaft 95 adjacent the front end thereof for pivotal movement therewith in the space between the plates 29 and 42. Shutter 103 contains an aperture 104 (FIG. 4) which is adapted to register momentarily with both the lens 33 and the lower end of the prism 47 each time shutter 103 is pivoted by shaft 95 into one of its extreme positions.

Secured to the forward, terminal end of shaft 95 is a collar 105 from which a lug 106 projects radially. Each time the shaft 95 pivots into and out of, respectively, its extreme counter-clockwise position, illustrated in FIG. 2, the pin 106 engages and then disengages a switch actuating arm 107 carried by a normally open microswitch 108 that is secured to the outer face of the support plate 29.

Mounted on the plate 28 adjacent opposite sides, respectively, of the housing 39 is a pair of spaced film cassette supports 111. Each support 111 has a lateral flange 113 along its lower edge which is secured by screws 114 (FIG. 1) to the bearing plate 28. The supports 111 are adapted to carry conventional film supply and take-up cassettes C and C', respectively, as shown by way of example in FIG. 2.

Secured to the plate 28 beneath one of the supports 111 (the left hand support as viewed in FIGS. 1 and 2) is a motor 116. Motor 116 has an armature or drive shaft 117 which projects upwardly through the associated support 111 and into the associated cassette C' as at 118 (FIG. 2).

Mounted in a bearing 121 (FIG. 2) on the housing 39 to rotate about an axis parallel to the axis of rotation of the motor shaft 117, and extending at its lower end downwardly into the housing is a rotatable shaft 122. Secured to the lower end of shaft 122 to rotate coaxially therewith in the housing 39 is a metering spool 123 having sprocket teeth 124 at opposite ends thereof which project through slots in the plate 42.

Secured to the shaft 122 at the exterior of the housing 39 is a single lobe cam 125 (FIG. 1), and an index plate 127. The periphery of plate 127 is notched at diametrically opposite sides thereof as at 128. Secured on top of housing 39 adjacent one side thereof is a single pole, double throw microswitch 131 having a switch actuating arm 132 which is urged resiliently into engagement with the peripheral surface of the cam 125. Pivotally mounted at one end by screw 133 on a boss 134 (FIG. 2), which projects upwardly from the top of housing 39 adjacent the opposite side thereof, is a locking dog 135, (FIG. 1) which is adapted to engage in the notches 128 in plate 127. Secured on top of housing 39 is a solenoid 137 having an armature 138 the free end of which is pivotally connected by means of a pin 139 to the locking dog 135. Also mounted on top of the housing 39 is a normally open microswitch 141 having a switch actuating lever 142 which is urged resiliently into engagement with one side of the dog 135.

The cover 18 (FIGS. 1 and 4) at the front of the housing 11 is releasably locked closed by a rigid latch member 151 (FIGS. 2 and 4), which is secured at its upper end by a conventional nut and bolt combination 152 to the inside of cover 18, and which at its lower end is bent rearwardly to provide a lateral projection 153 (FIG. 4) which is releasably engageable by a hook 154. Hook 154 is mounted by a pin 155 to pivot on a bracket 156 which is secured to and projects upwardly from the plate 28. A tension spring 157, which is connected at one end to the bracket 156 and at its opposite end to the hook 154, constantly urges the hook 154 in a clockwise direction in FIG. 2 into a latching engagement with the projection 153 on latch 151, when cover 18 is closed.

For disengaging hook 154 from the latch 151 a wire 161 (FIGS. 1, 2 and 4) is provided. This wire is connected at one end to the hook 154, passes through an eyelet 162, which is secured to one of the legs 25 (the left leg in FIG. 2) of member 22 through an opening 163 (FIG. 1) in this member and is secured at its opposite end to the lower end of a trip lever 164 (FIGS. 1 and 4) which is mounted at the rear of housing 11. Intermediate its ends lever 164 is mounted by a pin 165 to pivot on a bracket 166, which is secured to one of the flanges 24 (the left as viewed in FIG. 1). At its upper end lever 164 is pivotally connected by means of a pin 167 (FIG. 4) to the bifurcated inner end of a pushbutton 169 which extends through and is slidable in aligned apertures in the adjacent flange 24 and the rear wall 16 of the housing 11. Intermediate its ends pushbutton 169 has a shoulder 168 engageable with flange 24, and at its outer end it projects into an opening (FIG. 4) formed in the upper end of an elongate block 171, which is secured to the outer face of the housing wall 16.

Secured to this flange 24 beneath the trip lever 164 is a normally open switch 172 (FIG. 4). Projecting from switch 172 through aligned openings in this flange 24, the housing wall 16, and the block 171 is a further pushbutton 173 for actuating this switch.

Mounted on the rear face of block 171 for vertical sliding movement, as shown in FIGS. 3 and 4, is a safety plate or guard 174. Plate 174 is guided for movement on block 171 by means of two pairs of studs 175, which project from the face of block 171 through a pair of spaced, parallel slots 176 in the plate 174.

When the cover 18 is latched in closed position, plate 174 is disposed in its upper or full line position as shown in FIGS. 3 and 4, at which time the pushbutton 173 for switch 172 projects through an opening 177 (FIGS. 3 and 4) formed in plate 174 intermediate its ends. Also at this time, the upper end of plate 174 covers the pushbutton 169. Plate 174 is also provided with an opening 178 which is adapted to register with the pushbutton 173 when the plate 174 is shifted into its lower position shown in broken lines in FIGS. 3 and 4.

Mounted at the rear of the camera near the bottom thereof is a single pole, double throw switch 179 (FIG. 4) having a pushbutton 180 which projects through the flange 24 and housing wall 16 (FIGS. 3 and 4). In its lower position the plate 174 is adapted to cover the pushbutton 180 as shown in broken lines in FIG. 4.

Secured to the other flange 24 at the opposite side of the cover 67 is a switch 182 (FIG. 1) having a manually operable On-Off lever 183, which projects from the rear of the camera. Mounted adjacent this switch 182 is a conventional electric bulb socket 184 for carrying a warning light 185, which is viewable from the exterior of the housing 11.

Secured to the outer face of each leg 25 of member 22 at the front of housing 11 is a support for a flash lamp 186. The lamps 186 register with openings 187 (FIG. 2) formed in the front housing wall 15 adjacent opposite sides of the cover 18.

FIG. 5 illustrates one manner in which the motor 116, and the above-described switches and lamps may be connected across the leads $L_1$ and $L_2$ of an alternating current (AC) power supply as represented by a conventional male plug 191. When the switch 182 is closed, current flows through it to a conventional fuse 192, the warning light 185 and a wire 193 to one side of the single pole, double throw switch 179 (FIGS. 4 and 5). Each time switch 179 is actuated (pushed and released) it shifts from one to the other of two switch terminals 193 and 194, respectively. The coil 83′ for the shutter actuating solenoid 83 (FIG. 2) is connected at one end to the terminal 193, and at its opposite end by a wire 195 to the lead $L_2$. The coil 84′ for the shutter actuating solenoid 84 (FIG. 2) is connected at one end to terminal 194, and at its opposite end by the wire 195 to line $L_2$. The normally open switch 172 and the coil 137′ for the solenoid 137 (FIG. 1) are connected in parallel with the switch 179 and the solenoid coils 84′ and 83′, and in series with one another across the lines $L_1$ and $L_2$, by the wires 196, 197 and 198. The single pole, double throw switch 131 at one end thereof is connected to the wire 179, and at its opposite end is engageable selectively with one of two terminals 201 and 202. Terminal 201 is conected by a wire 203 to a terminal 204 and is connected by a wire 205 to a further terminal 206 of switch 93 (FIG. 4). Switch 93 is selectively engageable with either terminal 204 or 206, and is connected by a wire 207 to line $L_1$. Motor 116 is connected to the source of power by wire 198, and by the normally open switch 141 and a wire 208 to wire 207. The lamps 186 are connected in parallel with one another; and through the normally open switch 108 in series with the lamp 62, they are connected across the lines $L_1$ and $L_2$.

When the camera is to be used, a cassette C containing a supply of film, which is perforated along its marginal edges, is mounted on the support 111 shown to the right in FIG. 2, and film F therefrom is fed through the space 48 (FIG. 4) between the pressure plate 37 and the housing 39; and the perforated edges of the film are engaged with the sprocket teeth 124 (FIG. 2) of the metering spool 123. At its opposite end the film F is connected to a take-up spool (not illustrated) mounted in the cassette C′ which is carried on the left hand support 111 (FIG. 2) and which is connected to the driving shaft 117 of motor 116. An identification card (not illustrated) with the required descriptive matter printed thereon is mounted in the holder 70 (FIG. 4) at the rear of the housing and in registry with the sleeve 61; and the front and rear covers 18 and 67, respectively, are closed. Also the safety plate 174 is in its upper or full line position, thereby exposing the pushbutton 180. Upon closing of switch 182 and plugging plug 191 into a wall outlet or other source of power, one of the coils 83′ or 84′ (84′ in the position illustrated in FIG. 5) will be energized; and the camera will be ready for use.

To photograph the individual and the card in holder 70, the button 180 (FIG. 4) is pushed in, thereby causing the switch 179 to move away from terminal 194 (FIG. 5) into engagement with terminal 193. This interrupts the circuit to coil 84′, deenergizing solenoid 84 (FIG. 2), and energizes coil 83′ from line $L_1$ through wire 193, switch 179, terminal 193, coil 83′ and wire 195 to lead $L_2$, thereby to energize solenoid 83 (FIG. 2). Upon being energized solenoid 83 causes the slide bar 85 to be drawn to the right in FIG. 2, causing the shaft 95 to be pivoted into its extreme clockwise position in FIG. 2 through the agency of the pin 97 and rocker arm 96. As the shaft 95 pivots it causes the shutters 103 and 101 (FIG. 4) to pivot clockwise (FIG. 2) past the lenses carried by the lens housings 34 and 51 (FIG. 4), respectively. At the moment that the apertures 104 and 102 in the shutters register with their respective lenses, the lug 106 on cam 105 disengages the switch actuating arm 107, thereby causing switch 108 to close momentarily. The closing of switch 108 causes the lamps 62 and 186 to be energized momentarily, thereby illuminating, respectively, the face of the card carried in the holder 70, and the individual upon whom the camera is focused. Thereupon the lens 33 causes an image of the individual to be transmitted to the lower end of the prism 47; and the prism transmits this image through its upper end onto the frame of film then positioned in front of the upper end of the prism in the film gate 48. At the same time the image of the card in the holder 70 is transmitted by the objective lens in the mount 51 onto the same frame of film whereby both images are simultaneously photographed.

During the rotation of the rocker shaft 95 clockwise in FIG. 2, the projection 86 on the slide bar 85 moves away from the lug 87 at the left end of the slide plate 88, and toward the lug 87 located at the right end thereof. As the slide bar 85 approaches its extreme right hand position in FIG. 2 its projection 86 strikes the lug 87, thereby shifting the slide plate 88 toward the right so that it disengages the switch actuating arm 92, thereby causing switch 93 (FIG. 5) to disengage terminal 206, and to engage terminal 204. Engagement with terminal 204 completes a circuit from line $L_1$ through line 207, switch 93, terminal 204, line 203, terminal 201, switch 131, which is then held in engagement with terminal 201 by means of cam 125, line 197, coil 137' and line 198 to lead $L_2$. This energizes the solenoid 137 (FIG. 1) so that the lock dog 135 is disengaged from the notch 128 of plate 127 with which it has been engaged.

As the dog 135 pivots counterclockwise it causes the switch arm 142 to close switch 141, thereby completing a circuit to the motor 116 from line $L_1$ through lines 207 (FIG. 5), 208, now-closed switch 141, motor 116 and line 198 to lead $L_2$. The motor 116 then drives shaft 117 causing the film take-up spool to be rotated in a take-up direction, thereby advancing the film through the slot 48 (FIG. 4). As the film advances it rotates the metering spool 123 (FIGS. 1 and 2) and its shaft 122 in a clockwise direction in FIG. 1, thereby rotating the index plate 127 and cam 125, causing the dog 135 to ride on the periphery of the index plate, and the switch actuating arm 132 to drop down onto the reduced diameter portion of cam 125, thereby causing switch 131 to move out of engagement with terminal 201 and into engagement with its terminal 202. The movement of switch 131 away from the terminal 201 opens the circuit to the coil 137' (FIG. 5) of solenoid 137 (FIG. 1) so that the latter becomes deenergized. After the motor shaft 117 (FIG. 2) has rotated 180°, a distance sufficient to cause the previously exposed frame of film to be advanced into the film take-up cassette, and to be replaced by a new, unexposed frame of film, the next notch 128 in index plate 127 (the lowermost notch 128 illustrated in FIG. 1) is rotated into position for the dog to drop into this notch so that switch 141 opens and interrupts the circuit to the motor 116.

The camera is now in condition for making a new identification card. To do this a new card is placed in the holder 70 (FIG. 4), and the person it is to identify is positioned at a proper distance in front of the camera. Button 180 is once again pushed thereby causing switch 179 to disengage the terminal 193, and to reengage terminal 194 as illustrated in FIG. 5. Coil 84' of solenoid 84 (FIG. 1) is thus energized, thereby causing the slide bar 85 to return to the position illustrated in FIG. 2, thus causing shaft 95 and shutters 101 and 103 to be pivoted counterclockwise in FIG. 2 to their original positions. As the apertures 102 and 104 in the shutters register with the lenses in the holders 51 and 34, respectively, the lug 106 on cam 105 once again engages the switch actuator 107 so that switch 108 is temporarily closed, thereby causing the lamps 62 and 186 (FIG. 4) to be energized to illuminate the new card and the individual being photographed. As the shutter 101 approaches the position shown in FIG. 2, the projection 86 on the slide bar 85 strikes the lug 87 at the left end of the slide plate 88, causing plate 88 once again to engage the switch actuating arm 92, thereby causing switch 93 to shift away from terminal 204 (FIG. 5) and into engagement with terminal 206. At this time switch 131 is in engagement with terminal 202, so that a circuit is completed from main line $L_1$ through line 207, switch 93, terminal 206, line 205, terminal 202, switch 131, wire 197, coil 137' and wire 198 to main line $L_2$. Coil 137' is thus energized to effect the closing of switch 141 thereby to energize motor 116. As motor 116 begins to rotate, the switch arm 132 (FIG. 1) rides onto the lobe of cam 125 so that the switch 131 disengages terminal 202 and is returned into engagement with terminal 201, thereby interrupting the circuit to solenoid coil 137'. After the motor shaft is rotated 180° the dog 135 once again drops into a notch 128 on the index plate 127, thereby permitting switch 141 once again to open and interrupt the circuit to motor 116. This 180° rotation of the motor shaft 117 once again causes the previously exposed film to be advanced onto the take-up reel, which is driven by motor 116, and causes a new, unexposed frame of film to be positioned in front of the pressure plate 37.

In the manner above described, a new identification card may be photographed on a single frame of film each time the button 180 is pressed, until the entire roll of unexposed film has been wound onto the take-up roll or reel associated with the motor shaft 117.

To open the cover 18 to remove an exposed roll of film, and insert a new roll, it is necessary first to press the button 173 (FIG. 4) inwardly a sufficient distance to permit the guard plate 174 to be slid downwardly from its full line to its broken line position as shown in FIGS. 3 and 4. As the plate 174 slides downwardly, it holds the button 173 inwardly until the aperture 178 (FIG. 3) in the plate 174 registers with button 173 and permits the latter once again to return to its outermost position. At this time the upper end of the plate 174 will have been moved downwardly a sufficient distance to uncover or expose the push-button 169, and the lower end of the plate 174 will have passed over the button 180 to prevent any accidental actuation thereof.

When the button 173 is pressed inwardly the switch 172 (FIG. 5) is closed, thereby energizing coil 137' of solenoid 137 (FIG. 1) causing latch 135 to close switch 141 and energize motor 116. Regardless of when the button 173 is pushed to close the switch 172, the switches 93 and 131 will be positioned (for instance as shown in FIG. 5) so that the circuit between wires 207 and 197 is open. As the motor 116 begins to rotate, the periphery of index plate 127 passes beneath the dog 135 so that the latter maintains switch 141 closed after the pushbutton 173 (FIG. 4) registers with the opening 178 in the slide plate permitting opening of switch 172. This rotation of the motor shaft 117 also causes switch actuating arm 132 (FIG. 1) to ride downwardly onto the reduced diameter portion of the cam 125, thereby causing switch 131 to engage terminal 202.

When the motor shaft 117 has rotated 180 degrees, the dog 135 will, at this time, be held in its closed position by means of the solenoid 137, whose coil 137' is at this time energized through the circuit $L_1$, line 207, switch 93, terminal 206, line 205, switch 131, line 197, the coil 137' and line 198 to line $L_2$. The motor shaft 117 therefore continues to rotate beyond 180° so that dog 135 once again rides on the periphery of plate 127 to maintain the switch 141 closed for a further 180°.

During this further rotation of the motor shaft, the switch arm 132, however, rides onto the lobe of cam 125 so that switch 131 is once again returned into engagement with terminal 201, thereby interrupting the circuit to the solenoid coil 137'. For this reason, when a notch 128 in index plate 127 once again registers with dog 135, the latter drops into the notch thereby opening switch 141. This full revolution of the motor shaft causes two frames of film to be advanced past the pressure plate 37 and into the take-up cassette, thus safely covering the exposed film in the cassette.

After the guard plate 174 has been shifted into its lower position, and two frames of the film F have been advanced, button 169 may be pushed inward, thereby causing the trip lever 164 to pivot counterclockwise about the pin 165, (FIG. 4) causing cable 161 to rock hook 154 out of engagement with latch 151 unlocking cover 18. Cover 18 may then be opened. The pressure plate 37 may then be pivoted slightly counterclockwise (FIG. 4) about its hinge 36 to permit any film, which extends between said two cassettes, to be withdrawn from the space 48 in the front of the housing 39. Thereafter cassettes containing a new film supply and an empty take-up spool, respectively, may be placed on the support 111 (FIG. 2); and film from the supply may be fed, as above described, through the film gate 48 into engagement with the empty take-up spool.

After the film has been connected to the take-up spool, the cover 18 is closed, thereby causing the projection 153 (FIG. 4) on the latch 151 to strike the inclined upper camming surface 154' (FIG. 2) of the hook 154, to cause the hook 154 to be pivoted slightly counterclockwise (FIG. 2) until the projection slides beneath the end of hook 154, at which time spring 157 causes hook 154 to pivot clockwise over the top of projection 153 and into latching engagement therewith as illustrated in FIGS. 2 and 4.

Button 173 (FIG. 4) is then pressed inwardly to clear the opening 178 in the guard plate 174, and the latter is shifted upwardly to its full line position in FIG. 3, once again to cover button 169 and to expose button 180. The closing of switch 172 during the time it takes to slide the opening 177 in plate 174 upwardly and into registry with the push button 173 causes the lead end of new roll of film to be advanced for the equivalent of two frames as above described. A new, unexposed frame of film is now positioned in front of the pressure plate 137; so that the new roll of film may be employed to photograph individuals and their associated cards as above described.

From the foregoing it will be apparent that applicant has provided a compact camera for simultaneously photographing both an individual and his or her associated identification card onto a single frame of film. Upon being developed, each individual frame of film may be printed in any desired size, and the resultant I.D. card can be mounted in a plastic carrying case or the like. By placing the description of the individual and his or her signature upon a card and simultaneously photographing the card and the individual, forging of an I.D. card, and its use by another person are precluded. Applicant's novel camera also eliminates the need for manually advancing the film after each photograph, therefore eliminating accidental double exposures. Moreover, by providing a substantially fool-proof guard plate 174 in association with the push-buttons 169, 173 and 180, applicant has substantially eliminated the possibility of accidentally opening the camera while a previously exposed frame of film is still positioned at the exposure aperture.

While the invention has been described in connection with a specific embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention or the limits of the appended claims.

Having thus described my invention, what I claim is:

1. A camera for making identification cards and the like, comprising,
   (a) a housing,
   (b) means for mounting a supply of photosensitive material in said housing,
   (c) means for advancing successive increments of said material from said supply through an exposure chamber in said housing,
   (d) means in said housing for projecting the images of two different objects onto a single increment of material disposed in said exposure chamber, including
      (1) a pair of photographic objectives, and
      (2) a pair of shutters associated with said objectives,
   (e) means for intermittently moving said shutters in unison,
   (f) each of said shutters having therethrough an aperture adapted momentarily, during the movement of said shutters, to expose said single increment of material to said images,
   (g) control means responsive to the movement of said shutters to one of their extreme positions automatically to actuate said film advancing means long enough to advance said material one increment,
   (h) by-pass means connected to said advancing means and manually actuatable independently of the movement of said shutters to actuate said advancing means to advance said material two increments,
   (i) said housing having therein an opening through which said supply of material is adapted to be inserted,
   (j) a movable cover is mounted on said housing for closing said opening,
   (k) latching means for releasably securing said cover in a closed position over said opening, and manually actuatable to release said cover, and
   (l) guard means associated with said by-pass means and said latching means, and operative, when said cover is in its closed position, to prevent the actuation of said latching means to release said cover until after said by-pass means is actuated.

2. A camera for making identification cards and the like, comprising said advancing means including
   (a) a housing,
   (b) means for mounting a roll of film in said housing,
   (c) means for intermittently advancing an unexposed frame of film from said roll to an exposure chamber in said housing,
   (d) support means for removably mounting a printed card in said housing,
   (e) a pair of movable shutters in said housing, each of said shutters having therethrough an aperture,
   (f) manually actuatable means for intermittently moving said shutters in unison, and operative momentarily to register the aperture in one of said shutters with a card held in said support means, and the aperture in the other of said shutters with an object at the exterior of said housing, each time said shutters are moved,
   (g) means operative upon the registry of said apertures with said card and said object, respectively, to project images of said card and said object onto the unexposed frame of film in said chamber,
   (h) control means responsive to the movement of said shutters and operative automatically to actuate said advancing means momentarily after each intermittent movement of said shutters to feed a new frame of film into said chamber,
   (i) said shutter moving means comprising a reciprocable member connected to said shutters and operative to move said shutters in unison each time said member moves from one to the other of its extreme positions,
   (j) solenoid means connected to said member,
   (k) an electrical circuit for connecting said solenoid means to a source of power,
   (l) first, manually operable, two-position switch means in said circuit operative in one position thereof to cause said solenoid means to move said member to one of its extreme positions, and operative in its other position to cause said solenoid means to move said member to its other extreme position,
   (m) an electric motor connected in said circuit for drawing film from said supply through said exposure chamber, and said control means comprising
   (n) second switch means connected in said circuit and operable automatically by said member each time it moves to one of its extreme positions to actuate said motor, and
   (o) third switch means in said circuit responsive to the movement of film through said chamber to deenergize said motor after a single frame of film has been drawn through said chamber.

3. A camera as defined in claim 2 including
(a) fourth switch means in said circuit manually operable independently of said member to actuate said motor,
(b) said second and third switch means being operative upon the operation of said fourth switch means to actuate said motor long enough to cause two frames of film to be advanced through said chamber.

4. A camera comprising
(a) a housing having therein a pair of compartments separated by a partition,
(b) a sleeve mounted in one of said compartments and registering at one end thereof with an opening in said partition,
(c) means for intermittently advancing unexposed film transversely across the opposite end of said sleeve to place successive frames thereof in registry with said opening in said partition,
(d) means for removably mounting a card in the other of said compartments in registry with said opening and said sleeve,
(e) a first objective lens mounted in said sleeve to register at opposite ends thereof with said opening and with the frame of film disposed over said opposite end of said sleeve,
(f) a reflecting prism mounted in said housing with one end thereof projecting into said opposite end of said sleeve to confront part only of the frame of film disposed thereover, and with the opposite end thereof disposed at the exterior of said sleeve,
(g) a second objective lens mounted in the wall of said housing to register at one end with an object at the exterior of said housing, and at its opposite end with said opposite end of said prism,
(h) a pair of shutters oscillatably mounted in said housing, each of said shutters extending transversely across one end of one of said lenses, and having therethrough an aperture which is adapted momentarily to register with said one end of its associated lens each time the shutter moves from one to the other of its extreme positions,
(i) manually actuatable means for intermittently moving said shutters in unison from one to the other of their extreme positions,
(j) means for illuminating a card disposed in said second chamber each time the aperture in the shutter associated with said first lens registers with the latter, and
(k) control means responsive to said shutter moving means for automatically actuating said advancing means momentarily each time said shutters move to one of their extreme positions.

5. A camera as defined in claim 4, wherein said advancing means comprises
(a) an electric motor for winding film from a supply spool at one side of said sleeve onto a take-up spool at the opposite side thereof, and said control means comprises,
(b) a film metering spool rotatably mounted in said sleeve to be rotated by the film each time the latter is advanced,
(c) a pair of members connected to said metering spool to be rotated thereby, and
(d) a pair of switches controlled by said members, one of said switches being in a first motor energizing circuit, which is closed momentarily each time said shutters move to one of their extreme positions thereby to energize said motor, and the other of said pair of switches being in a second motor energizing circuit operative, each time said motor is energized, to maintain said motor energized for a period of time sufficient to advance said film one frame.

6. A camera as defined in claim 5 wherein said control means further includes a third switch responsive to said shutter moving means and operative to close said first energizing circuit through said one switch each time said shutters move to one of their extreme positions.

7. A camera as defined in claim 6 including
(a) a fourth switch manually operable independently of the movement of said shutters momentarily to energize said motor through a third motor energizing circuit,
(b) said one switch being operative, after said motor has advanced said film one frame in response to the energization of said third energizing circuit, to close said first energizing circuit momentarily to advance said film one further frame.

8. A camera as defined in claim 7, including
(a) a cover for said one compartment,
(b) means for latching said cover releasably in a closed position over an opening in said housing,
(c) manually operable means for releasing said latching means to open said cover, and
(d) reciprocable guard means for preventing simultaneuos operation of said releasing means and said shutter moving means, when said guard means is in one of its extreme positions,
(e) said guard means being movable from one to the other of its extreme positions only after the actuation of said fourth switch.

References Cited

UNITED STATES PATENTS

| | | | |
|---|---|---|---|
| 1,645,590 | 10/1927 | Ernst | 88—24 |
| 2,125,388 | 8/1938 | Monroe | 95—1.1 |
| 2,250,442 | 7/1941 | Abell | 95—1.1 X |
| 2,721,497 | 10/1955 | Warren | 88—24 |
| 2,809,571 | 10/1957 | Christensen | 95—1.1 X |
| 2,830,512 | 4/1958 | Nagel | 95—1.1 |
| 2,896,522 | 7/1959 | Stein | 95—1.1 |
| 2,916,977 | 12/1959 | St. George | 95—1.1 X |
| 3,190,202 | 6/1965 | Fujimoto | 95—1.1 |
| 3,223,007 | 12/1965 | Cranen | 95—1.1 |

JOHN M. HORAN, *Primary Examiner.*